Jan. 31, 1967 P. R. HORN 3,301,270
ELECTROLYTIC DEVICE WITH CASING HAVING A RIGID
AND A RESILIENT SEAL COMBINATION
Filed Oct. 7, 1963

Inventor,
Philip R. Horn,
by Sidney Greenberg
His Attorney.

United States Patent Office 3,301,270
Patented Jan. 31, 1967

3,301,270
ELECTROLYTIC DEVICE WITH CASING HAVING A RIGID AND A RESILIENT SEAL COMBINATION
Philip R. Horn, Columbia, S.C., assignor to General Electric Company, a corporation of New York
Filed Oct. 7, 1963, Ser. No. 314,289
9 Claims. (Cl. 317—230)

The present invention relates to seal structures and more particularly to a seal assembly for electrical devices such as electrolytic capacitors.

A frequent cause of failure of electrical capacitors is the loss of electrolyte through inadequate seals provided for the capacitor case. Such loss leads to variation and degradation of the electrical properties of the unit, as well as premature breakdown. Prior seal structures used for electrolytic capacitors have not in general proved entirely satisfactory for various reasons. For example, certain of the prior seal structures have not adequately prevented escape of the electrolyte liquid or vapor emanating therefrom, while in those cases where such escape was effectively prevented, the buildup of vapor or gas pressure within the unit often resulted in ejection of the end seal. Certain of the known seal assemblies have comprised several superimposed parts, leading to difficulties in proper assembly, especially under large scale production conditions, and such capacitor units have been relatively costly and difficult to produce.

It is an object of the invention to provide a seal structure for electrical devices, especially electrolytic capacitors and the like, which provides an effective and long lasting seal and avoids the disadvantages of the prior art structures of this type.

It is another object of the invention to provide a seal structure of the above type which is characterized by a strong, electrically insulating, fluid-tight seal preventing escape of the contained liquid or vapor, which has high mechanical strength to resist internal pressure, and which forms an effective vapor barrier.

It is still another object of the invention to provide a seal structure of the above type which is simple in construction, which facilitates assembly of the electrical device to which it is applied, and which can be economically produced.

Other objects and advantages will become apparent from the following description and the accompanying claims.

With the above objects in view, the present invention relates, in a preferred embodiment, to an electrolytic capacitor comprising, in combination, a casing containing a fluid and having an open end, a capacitor section within the casing, a terminal lead extending from the capacitor section outwardly through the open end, and a closure sealing the casing opening comprising a superposed assembly of substantially rigid fluid-impermeable outer sealing means and a cup-shaped inner member of resilient insulating material inwardly adjacent the outer rigid means, the inner member having a base portion adjacent the fluid-impermeable means and an annular wall portion projecting inwardly from the base portion, so that the cup-shaped member opens into the interior of the casing with its annular wall-portion lining the adjacent wall of the casing.

The invention will be better understood from the following description taken in conjunction with the accompanying drawing, in which.

Figure 1:
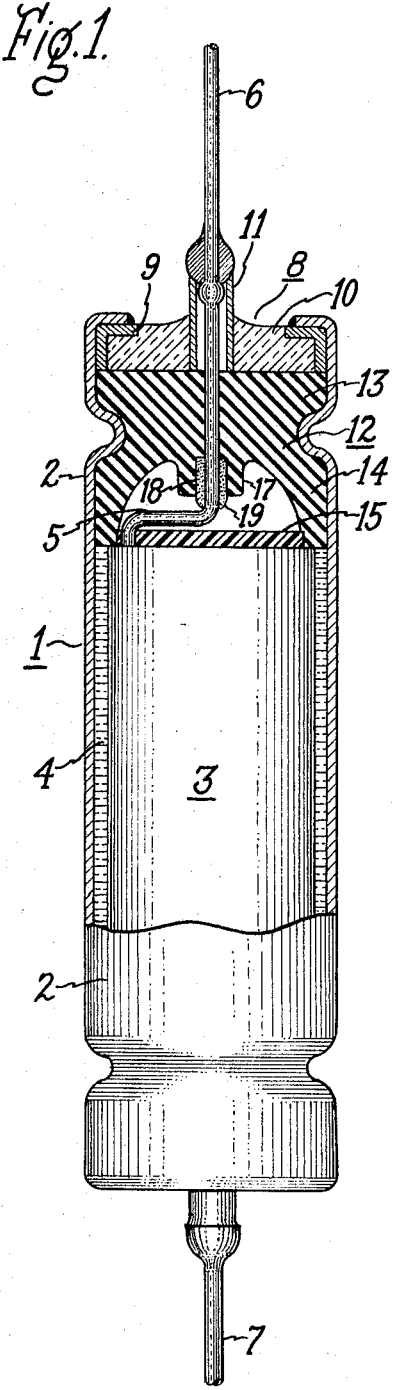
FIG. 1 is an elevational view partially in section of an electrical capacitor in which the invention is embodied.

Referring now to the drawing, and particularly to FIG. 1, there is shown an electrolytic capacitor 1 comprising a metal casing 2 and containing a rolled capacitor section 3 conventionally made up of a pair of convolutely wound electrode foils of film-forming metal such as tantalum, niobium, aluminum or other capacitor electrode metal known in the art, separated by paper or other dielectric spacer material, roll 3 usually being wrapped with dielectric sheet material to electrically insulate it from metal casing 2. Capacitor section 3 is immersed in and impregnated by liquid electrolyte 4 contained in casing 2. The electrolyte may be of any conventional or known type of capacitor electrolyte, as for example an aqueous ammonium pentaborate-glycol solution or a non-aqueous organic liquid composition or mixture, and it may be of liquid, gel, paste, or other form.

Tap lead wire 5 connected to one of the electrode foils of capacitor section 3 extends outwardly from one end of casing 2, and a corresponding tap lead (not shown) connected to the other electrode foil extends outwardly from the opposite end. These leads, which normally are composed of film-forming metals such as tantalum, niobium, aluminum, or the like, are connected at their outer ends to external leads 6 and 7 respectively, e.g. by welding.

In a usual construction, casing 2 is tubular with opposite open ends, each end being fluid-tightly closed by a seal assembly constructed in accordance with the invention. While the seal structure of only one end of the capacitor casing is shown and described, it will be understood that the opposite end has a corresponding seal structure.

It will also be understood that the described seal structures could be employed in types of capacitors other than those shown. For example, casing 2 could be of cup-shaped form with an anode of suitable type (such as a sintered slug or wound-foil anode) inserted therein instead of capacitor section 3, the casing serving as a cathode and having a terminal lead soldered to its bottom end, all as well known in the art.

In accordance with an embodiment of the invention, there is arranged at the open end of casing 2 an outer glass-to-metal seal structure 8 comprising a metal retaining ring 9 having a glass seal 10 formed therein and a metal eyelet 11 passing axially through the glass seal for receiving tap lead 5. Retaining ring 9 and eyelet 11 are preferably made of solderable metal such as tin-coated nickel-iron alloy, or the like. It will be understood that, if desired, non-solderable metal could be used for casing 2 and ring 9, in which case the parts are welded rather than soldered together. The glass seal structure 8 per se may be of known type of compression glass seals usch as are presently commercially available.

In accordance with a significant feature of the invention, an inner cup-shaped seal member 12 of resilient electrically insulating material, such as rubber, is arranged inwardly adjacent glass seal 8. A particularly preferred material for seal member 12 is butyl rubber, but other rubbery, highly resilient materials of natural or synthetic nature may be employed, such as those produced by polymerization of butadiene alone or with styrene, e.g., Buna, Hycar; by polymerization of chloroprene, e.g., neoprene; and other rubber-substitute products known in the art.

Seal member 12 is formed with a solid base portion 13 and an annular wall portion 14 extending therefrom, and is arranged in casing 2 with its flat bottom surface in intimate contact with glass seal 8 and with its rim portion in contact with the periphery of the end face of capacitor section 3. In the assembled condition, resilient cup member 12 is normally under longitudinal as well as lateral compression.

An insulating disc 15 is arranged overlying the capacitor section end face surrounded by the annular rim of member 12. Disc 15 is preferably composed of an electrically insulating material characterized by low vapor transmission, high resistance to severe chemical and thermal conditions, lack of moisture absorption, and high resistance to wetting by water and chemical solvents. A particularly preferred material for this purpose is polytetrafluoroethylene (Teflon). Disc 15 serves to keep lead wire 5, which passes through it, in proper position and to protect the end face of capacitor section 3.

The outer diameter of member 12 is slightly larger than the inner diameter of casing 2 so that it snugly fits within the casing. In the assembled condition, casing 2 is rolled over at its outer rim over glass seal 8 and soldered to retaining ring 9, and the casing is crimped at its sidewall into solid base portion 13 of member 12 (as shown in FIG. 1) to firmly retain the parts in position. In the assembly, member 12, due to its described longitudinal (axial) compression, resiliently bears against the end face of capacitor section 3 and thereby prevents longitudinal shifting of the capacitor section. Furthermore, such compression results in a tight compressive fit of the rim portion of member 12 between the periphery of disc 15 and the casing wall, thereby enhancing the sealing engagement of the rim with its contacting parts.

Figure 2:
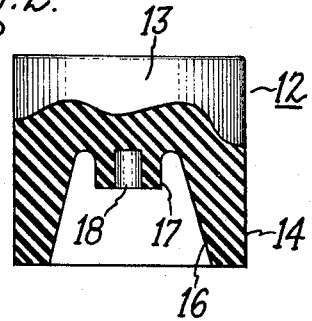
FIG. 2 is a partly sectional view of a seal component employed in the FIG. 1 device.
Figure 3:
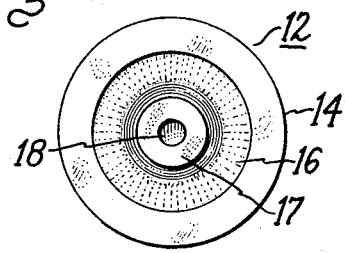
FIG. 3 is a view of the FIG. 2 seal component as viewed from the underside thereof.

As shown more clearly in FIGS. 2 and 3, the annular side wall 14 of cup-shaped member 12 is formed with a sloping, e.g., conical, inner surface 16 facing the interior of the capacitor casing. Member 12 is further formed with an inner portion 17 projecting axially from its solid bottom portion 13 into its hollow interior. Projecting portion 17 is formed with an axial recess 18, preferably of cylindrical shape, to provide a cup therein. Within the cup thus formed there is provided sealant material 19, such as an adhesive silicone compound to bond lead wire 5 to portion 17. Sealant material 19 should be such that it wets both parts and intimately adheres to both, and should remain flexible under all operating conditions to which the device will be subjected.

In the assembled arrangement, lead wire 5 passes through seal member 12 via axial recess 18 and base portion 13 into eyelet 11 of glass seal 8, where it is joined by a welded connection to external lead 6, usually composed of a solderable metal, such as nickel, copper or the like. The outer opening of eyelet 11 is provided with a solder seal to complete the seal structure.

Due to its nature, shape and arrangement as described, seal component 12 serves a number of functions in the capacitor unit and thereby enables dispensing with a plurality of seal components heretofore used in such devices. Base portion 13 serves as a sealing means to prevent escape of electrolyte in liquid or vapor form. In the arrangement shown, the rim of wall portion 14 fits under compression between the periphery of insulating disc 15 and the casing wall and it thereby functions as a vibration dampening means, as well as preventing movement of the contained component of the capacitor unit relative to the case. Wall portion 14 also serves as an insulating shield to prevent internal lead wire 5 from coming into contact with casing 2, which would result in a risk of short-circuit failure of the capacitor. Recess 18 serves a two-fold function, namely, as a guide opening for properly inserting lead wire 5, and as a reservoir for sealant material 19. The walls of projecting portion 17 are, of course, flexible, and accordingly movement of lead wire 5 therein would not tend to break the seal between the lead wire and sealing material 19.

Of particular importance is the feature whereby the annular resilient wall portion 14 comes into tighter sealing engagement with the wall of casing 2 upon generation of any gas pressure within the unit, which results in pressing 14 into more intimate contact with the casing wall.

Figure 4:
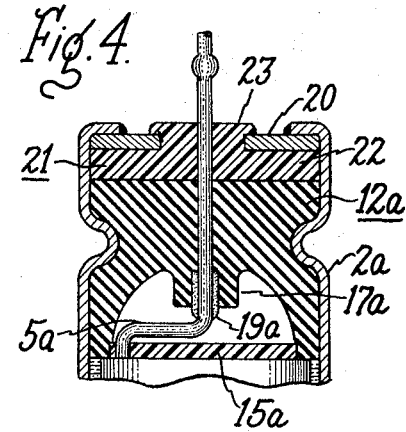
FIG. 4 is a sectional view of a different embodiment of a seal assembly constructed in accordance with the invention.

FIG. 4 shows another embodiment of the capacitor seal structure of the invention. In this device, outer glass seal 8 is replaced by a seal assembly comprising, in superposed relation, outer rigid apertured disc or washer 20 and inner bushing member 21, the latter having a main disc portion 22 and a hub portion 23 projecting axially outward through the aperture in washer 20. Bushing member 21 is preferably made of insulating material of the composition and properties described in connection with disc 15 above. The remaining components of the FIG. 4 seal structure, including cup-shaped resilient member 12a, are similar in construction and arrangement to those described in connection with the FIG. 1 embodiment.

Washer member 20 of the FIG. 4 embodiment is preferably made of a rigid, fluid-impermeable material such as metal, and normally is made of the same metal as that of the casing to avoid the risk of corrosion attendant on the use of dissimilar metals for these parts. Preferably, casing 2a and washer 20 are each made of aluminum. Washer 20 serves to mechanically reinforce the seal structure, particularly against internal pressure which may build up within the capacitor casing, and it contributes to the prevention of vapor transmission through the seal.

Bushing member 21 serves primarily as a barrier to vapor transmission through the seal assembly, and, as shown, terminal lead 5a passes axially through hub portion 23 thereof so as to be electrically insulated thereby from metal washer 20.

In a typical method of assembling a sealed unit such as shown in FIG. 4, the capacitor roll section with lead wire 5a attached thereto is initially prepared, the end of the lead wire is sharpened and insulating disc 15a is pierced by the lead wire at its margin and positioned against the capacitor section as shown. With resilient member 12a supported in a suitable holder, lead wire 5a with sealant material 19a applied thereon is pushed through the recess in projecting portion 17a and through Teflon bushing member 21 which is superimposed on the resilient member 12a. These parts are then assembled in the casing. The device is placed in a vacuum treating apparatus for introducing the electrolyte into the interior of the casing. Thereafter the capacitor is removed and surplus electrolyte is cleaned off bushing member 21. Aluminum washer 20 is superimposed on bushing member 21 and the casing is then simultaneously crimped to member 12a and rolled at its rim over washer 20.

There is thus provided by the invention a seal structure which makes possible excellent retention of the fill electrolyte in the capacitor over a long period of time and thus significantly contributes to maintaining the electrical properties of the capacitors substantially constant.

Although the invention has been described principally with respect to electrolytic capacitors, it will be evident that the described seal structure may have application to other electrical devices where maintenance of a strong fluid-tight seal for the container of the electrical device is of importance.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A sealed electrical assembly comprising, in combination, a casing having an open end, an electrolyte in said casing, an electrical device in said casing, said electrical device having a terminal lead extending through said open end, a closure sealing the open end comprising a superposed assembly of substantially rigid, fluid impermeable means sealed in said casing and including an eyelet, and an inner member of resilient insulating material inwardly adjacent said outer rigid means and in pressure sealing engagement with said casing, said inner resilient member having a base portion contacting said fluid-impermeable means and an annular wall portion projecting inwardly from said base portion and forming a cup-shaped member which opens into the interior of said casing with said annular wall portion lining the adjacent wall of said casing, said terminal lead bonded to and passing through said inner resilient member and said eyelet, to the exterior of said casing.

2. A sealed electrical assembly comprising, in combination, a casing having an open end, an electrolyte in said casing, an electrical device in said casing, said electrical device having a terminal lead extending through said open end, a closure sealing the open end comprising a superposed assembly of substantially rigid, fluid impermeable means sealed in said casing and including an eyelet, and an inner member of resilient insulating material inwardly adjacent said outer rigid means and in pressure sealing engagement with said casing, said inner resilient member having a base portion contacting said fluid-impermeable means and an annular wall portion projecting inwardly from said base portion and forming a cup-shaped member which opens into the interior of said casing with said annular wall portion lining the adjacent wall of said casing, said cup-shaped member being formed at its inner side with an inwardly projecting portion having a recess therein for receiving a terminal lead member, said terminal lead passing through said inner resilient member via said recess in said projecting portion and bonded to said projecting portion, and said terminal passing through said outer rigid means via said eyelet and sealed to said eyelet.

3. An electrical capacitor comprising, in combination, a casing having on open end, an electrolyte in said casing, a capacitor section in said casing and immersed in said electrolyte, said electrical capacitor having a terminal lead extending through said open end, a closure sealing the open end comprising a superposed assembly of substantially rigid, fluid impermeable means sealed in said casing and including an eyelet, and an inner member of resilient insulating material inwardly adjacent said outer rigid means and in pressure sealing engagement with said casing, said inner resilient member having a base portion contacting said fluid-impermeable means and an annular wall portion projecting inwardly from said base portion and forming a cup-shaped member which opens into the interior of said casing with said annular wall portion lining the adjacent wall of said casing, said terminal lead bonded to and passing through said inner resilient member and said eyelet, to the exterior of said casing.

4. An electrical capacitor comprising, in combination, a casing having an open end, an electrolyte in said casing, a capacitor section in said casing and immersed in said electrolyte, said capacitor section having a terminal lead extending through said open end, a closure sealing the open end comprising a superposed assembly of substantially rigid, fluid impermeable means sealed in said casing and including an eyelet, and an inner member of resilient insulating material inwardly adjacent said outer rigid means and in pressure sealing engagement with said casing, said inner resilient member having a base portion contacting said fluid-impermeable means and an annular wall portion projecting inwardly from said base portion and forming a cup-shaped member which opens into the interior of said casing with said annular wall portion lining the adjacent wall of said casing, said cup-shaped member being formed at its inner side with an inwardly projecting portion having a recess therein for receiving a terminal lead member, said terminal lead passing through said inner resilient member via said recess in said projecting portion and bonded to said projecting portion, and said terminal passing through said outer rigid means via said eyelet and sealed to said eyelet.

5. An electrical capacitor comprising, in combination, a casing having an open end, an electrolyte in said casing, a capacitor section in said casing and immersed in said electrolyte, said electrical capacitor having a terminal lead extending through said opening, a closure sealing the open end comprising a superposed assembly of substantially rigid, fluid impermeable means sealed in said casing and including an eyelet, and an inner member of resilient insulating material inwardly adjacent said outer rigid means and in pressure sealing engagement with said casing, said inner resilient member having a base portion contacting said fluid-impermeable means and an annular wall portion projecting inwardly from said base portion and in contact with said capacitor section and forming a cup-shaped member which opens into the interior of said casing with said annular wall portion lining the adjacent wall of said casing, said annular wall portion of said cup-shaped member having a substantially conical interior surface, said terminal lead bonded to and passing through said inner resilient member and said eyelet, to the exterior of said casing.

6. An electrical capacitor comprising, in combination, a casing having an open end, an electrolyte in said casing, a capacitor section in said casing and immersed in said electrolyte, said electrical capacitor having a terminal lead extending through said open end, a closure sealing the open end comprising a superposed assembly of substantially rigid, fluid impermeable means sealed in said casing and including an eyelet, and an inner member of resilient insulating material inwardly adjacent said outer rigid means and in pressure sealing engagement with said casing, said inner resilient member having a base portion contacting said fluid-impermeable means and an annular wall portion projecting inwardly from said base portion and in contact with said capacitor section and forming a cup-shaped member which opens into the interior of said casing with said annular wall portion lining the adjacent wall of said casing, said cup-shaped member being formed at its inner side with an inwardly projecting portion having a recess therein for receiving a terminal lead member, said terminal lead passing through said inner resilient member via said recess in said projecting portion and bonded to said projecting portion, and said terminal lead passing through said outer rigid means via said eyelet and sealed to said eyelet.

7. An electrical capacitor comprising, in combination, a casing having an open end, an electrolyte in said casing, a capacitor section in said casing and immersed in said electrolyte, said capacitor section having a terminal lead extending through said open end, a closure sealing the open end comprising a superposed assembly of an outer glass member sealed in said casing and including an eyelet, and an inner member of resilient insulating material inwardly adjacent said outer rigid means and in pressure sealing engagement with an inwardly projecting peripheral formation in the wall of said casing, said inner resilient member having a base portion contacting said fluid-impermeable means and an annular wall portion projecting inwardly from said base portion and in contact with said capacitor section and forming a cup-shaped member which opens into the interior of said casing with said annular wall portion lining the adjacent wall of said casing, said annular wall portion of said cup-shaped member having a substantially conical interior surface, said cup-shaped member being formed at its inner side with an inwardly projecting portion having a recess therein for receiving a terminal lead member, said terminal lead passing through said inner resilient member via said recess in said projecting portion and bonded to said projecting portion, and said terminal lead passing through said outer rigid means via said eyelet and sealed to said eyelet.

8. An electrical capacitor, as in claim 7, wherein an insulating disc member is arranged overlying said capacitor section with its periphery spaced from the casing wall, and the rim of said annular wall portion of said cup-shaped member is arranged with a compressive fit between the periphery of said disc member and said casing.

9. An electrical capacitor comprising, in combination, a casing having an open end and containing therein an electrolyte and a capacitor section immersed in said electrolyte, a terminal lead extending outwardly from said capacitor section through said open end, and a seal assembly fluid-tightly closing the open end of the capacitor casing and electrically insulating the terminal lead from said casing, said seal assembly comprising an outer rigid, fluid-impermeable member having a central aperture, an intermediate member inwardly adjacent said outer rigid member and composed of fluorinated polyethylene and having an axially projecting hub portion extending through and closely fitting said central aperture of said outer rigid member, and a cup-shaped inner member of resilient insulating material inwardly adjacent said intermediate member, said inner member having a base portion adjacent said intermediate member and an annular wall portion projecting inwardly from said base portion, so that said cup-shaped member opens into the interior of the casing with its annular wall portion lining the adjacent wall of said casing, said base portion of said cup-shaped member being formed at its inner side with an inwardly projecting portion having a recess therein for receiving a lead member therein, said terminal lead passing through said seal assembly via said recess in said projecting portion.

References Cited by the Examiner

UNITED STATES PATENTS

| 1,949,953 | 3/1934 | Clark | 317—230 |
| 2,848,130 | 8/1958 | Jesnig | 215—47 |
| 2,941,024 | 6/1960 | Lamphier | 317—230 |
| 3,114,085 | 12/1963 | Ruscetta et al. | 317—230 |
| 3,243,668 | 3/1966 | Diggens | 317—230 |

JOHN W. HUCKERT, *Primary Examiner.*

J. D. KALLAM, *Assistant Examiner.*